Figure 1:
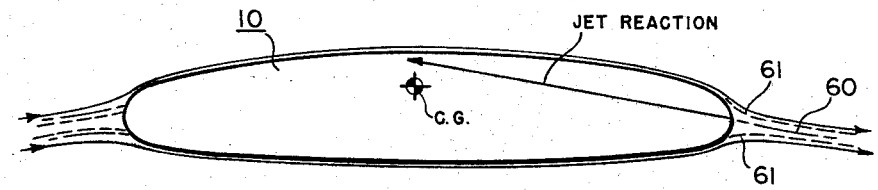

Sept. 3, 1963 R. W. GRISWOLD II 3,102,704
AIRFOIL JET REACTION CONTROL MEANS
Original Filed Oct. 5, 1955 3 Sheets-Sheet 2
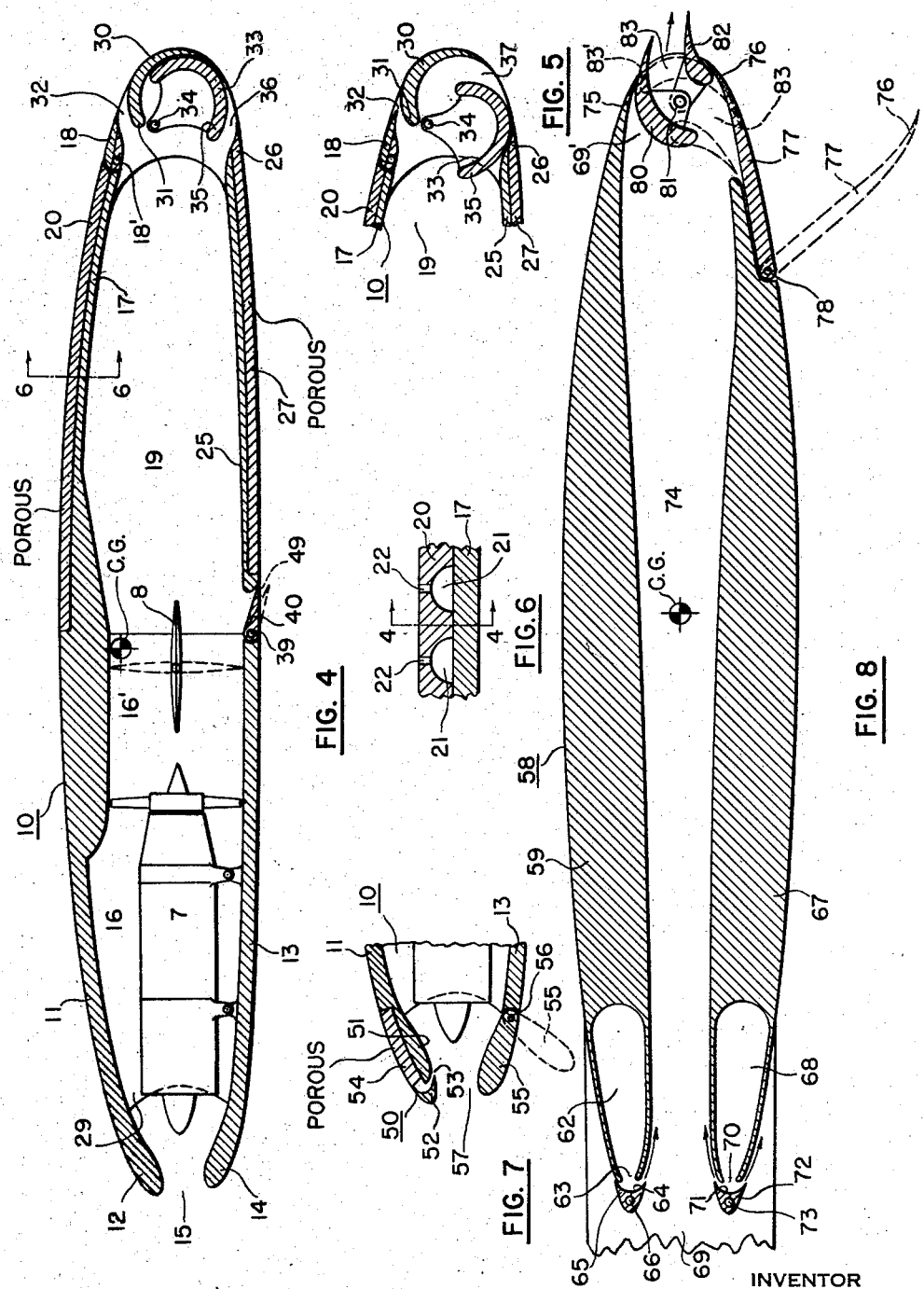
INVENTOR
ROGER W. GRISWOLD II
BY
Frank H. Borden
ATTORNEY

INVENTOR.
ROGER W. GRISWOLD II

United States Patent Office 3,102,704
Patented Sept. 3, 1963

3,102,704
AIRFOIL JET REACTION CONTROL MEANS
Roger W. Griswold II, Old Lyme, Conn.
Original application Oct. 5, 1955, Ser. No. 538,690.
Divided and this application Nov. 15, 1960, Ser. No. 70,102
26 Claims. (Cl. 244—42)

This invention relates primarily to integrated jet-wing systems for fixed-wing aircraft wherein direct-lift and propulsion are provided concomitantly with coincidental flow control and has particular reference to jet-reaction control means effective throughout a wide range of jet deflection to maintain substantially constant wing pitching moments irrespective of angularity of the instant jet reaction.

This constitutes a division of application 538,690, entitled Integrated Jet-Wing Aircraft, filed October 5, 1955, now abandoned.

Conventional fixed-wing airplanes are characterized chiefly by two predominant design features, both of which impose severe inherent limitations: (1) they comprise powered gliders essentially in that the propulsive system of the aircraft is functionally segregated, for the most part, from the aerodynamic system of the wing—the increased emphasis in recent years upon such a design concept being carried to one extreme form by the pod-type mounting of the engines well below the wings: (2) the airfoils of all so-called modern aircraft have the common design feature of an effectively sharp trailing edge which functions to cause break-away of the flow and proximate fixation of the rear stagnation point, thus resulting in lift that is thereby very limited and also entirely dependent upon angle-of-attack, for a given airfoil configuration. Such sharp-rear-edge airfoils are herein designated as conventional airfoils.

The recent development of tail-sitter and convertiplane aircraft wherein the wing is redundant (or worse) as a lifting device for the take-off and landing operations, further illustrates current limitative design trends in other extreme forms of segregated propulsion-lift systems. On the other hand, of course, there have been numerous developments of various powered-airfoil boundary layer and circulation control devices to decrease drag and increase lift, by means of auxiliary or split-powered flow control systems. Also, the jet flap concept wherein the primary propulsive flow discharges through a divided sharp trailing edge, is currently being investigated. All of the foregoing systems comprise some partial integration of the propulsive-aerodynamic system, to greater or less degree, but in no case do they involve a completely integrated system, so far as known. Practically all of these prior art powered airfoil devices have been applied to conventional airfoils. Previous to this disclosure, no one within knowledge of the instant inventor had proposed or demonstrated means for designing a fixed-wing jet aircraft capable of vertical take-off and landing performance in a substantially horizontal attitude, including tailless configurations thereof, without employing the convertiplane concept in one form or another, i.e. use of duplicate lift systems sequentially, the one for the high speed range being essentially redundant when the other lift system takes over at low speeds.

The primary reason the art has so far failed to solve the problems incident to the above specified category of ultra slow speed performance is because of the prohibitive limitations inherent in conventional sharp trailing edge airfoils. Briefly, these comprise: (A) initiation of separation over the upper surface by the flow break-away at the trailing edge; (B) the consequent premature wing stall combined with the essentially-fixed rear stagnation point together restrict maximum lift to very low limits; (C) because the downwash can not move forwardly of the terminal dividing streamline at the trailing edge, the circulatory flow about the airfoil is consequently inhibited and as its strength increases within those limits, which can be extended by increasing camber as by deflecting a flap, so do the negative (diving) pitching moments associated with such lift likewise increase. In this latter connection, it is perfectly obvious that the primary-powered jet flap which discharges from the terminus of a sharp trailing edge airfoil, when deflected for maximum lift, will be characterized by extremely large adverse pitching moments due to the great increase in effective moment arm between the jet reaction and the aircraft C.G. (center of gravity). The jet flap which cuts across the circulatory flow at the wing trailing edge, accordingly will necessitate incorporating an "out-size" horizontal tail in such aircraft in order to stabilize same longitudinally, with resultant substantially reduced net positive lift, plus the built-in drag increment due to the added wetted surface of the large empennage. At the most optimistic, the jet flap concept borders on the marginal side of practical aircraft design, so far as its high-lift applications are concerned.

The foregoing inherent limitations of the conventional sharp trailing edge airfoil are conveniently circumvented by the several novel features of the instant invention. A typical integrated jet-wing airfoil section capable of providing the functional characteristics outlined in the following paragraph may and usually will comprise a ducted type airfoil, and further may have either a structurally sharp trailing edge or one of fully rounded geometry, always provided the system functions such that the terminal flow phenomena correspond to those characteristic of an effectively sharp trailing edge in the high speed range, and to the potential flow phenomena (for particular configurations) characteristic of an effectively rounded trailing edge at ultra slow speeds as will be controlled throughout the speed range, directly or indirectly, by the kinetic energy of the primary-powered jet efflux discharging from the wing, as well as by the influx of this internal flow at the divided nose entry of such an airfoil. The flow entry phenomena likewise have a powerful and controlling effect upon the induced external circulatory flow at high values of lift.

Such unconventional functionally-integrated powered airfoil combinations which are distinguished chiefly by widely variable but controlled terminal stagnation points, are designed to provide both boundary layer and circulation control of the external flow thereover, coincidentally with direct dual jet-lift and complemental thrust effects, which together result in the following characteristic primary flow phenomena, the attainment of which comprise the principal objects of the invention: (A) separation over any of the airfoil surfaces is virtually eliminated by means of boundary layer control, both in the leading and trailing edge regions as may be required in particular cases; (B) the consequent avoidance of the wing stall plus controlled movement of the downwash confluence streamline to provide substantial forward travel of the rear stagnation point, together with related rearward travel of the front stagnation point, correspond, in effect, to attaining potential flow over an airfoil of very greatly increased camber and thus generally maximal values of circulation-lift independently of angle-of-attack, due to circulation control; (C) these substantial circulatory flow phenomena which are generally similar to the Magnus (rotating-cylinder) circulation effect because of the resultant nearly symmetrical streamlines and pressure distribution bilaterally about the integrated jet-wing, are a function of effectively moving the point of application of the jet reaction forward on the airfoil, as may be required with increasing angular deflection of the jet, so as to thereby maintain within close limits a relatively small moment arm between the jet reaction and the C.G. of the aircraft irrespective of jet deflection, with consequent minimal resultant change in the pitching moments associated either with the simple jet reaction thrust-lift or with the compound jet induced circulation-lift. The revolutionary implication of such a basic contribution to the art, is the avoidance of any consequential limitation—so far as longitudinal stability and control are concerned—on the magnitude of the primary-powered jet momentum that can be applied to a wing to provide direct-lift, from a practical aircraft design standpoint. Therefore, horizontal-attitude hovering flight in fixed-wing jet aircraft, minus any convertiplane redundant structure or mechanisms or other design detriments, has now become entirely feasible even for tailless configurations, on the basis of this disclosure—given a jet thrust-lift value of 1g or better (i.e. exceeding the gross weight of the aircraft) and effective control means responsive to the internally energized integrated aerodynamic-propulsive flow system.

It is accordingly among the further objects of this invention relating to integrated jet-wing aircraft, to provide: a ducted wing system wherein the internal flow is primary-powered and both the influx and efflux thereof mutually effect powerful circulation control of the external flow about such a wing system; integral jet reaction thrust-lift and jet induced circulation-lift effects coincidentally with complemental self-propulsive thrust effects in a ducted-airfoil wing system wherein the jet is primary powered; a wide selective range of the foregoing effects within a moderate range of pitching moments; maintenance of the centers of pressure from the jet itself and from the jet induced circulation-lift, proximate to the mid-chord of the airfoil, irrespective of jet deflection; nearly symmetrical streamlines and pressure distribution bilaterally of the airfoil consequent from circulatory flow generally similar to the Magnus effect, the magnitude of which is primarily a function of the momentum and angular deflection of the jet independently of angle-of-attack changes; a fluid-flap, in effect, comprised of spaced plural jets, at least one of which discharges generally in the direction of the circulatory flow and at least one other such jet discharges in opposition thereto, whereby the magnitude of the resultant circulation about the airfoil is primarily determined by the relative momentum of the respective jets, the points of application thereof to the external flow, and the effective angular deflection of the fluid-flap; continuously-operative boundary layer control self-induced by a functionally-integrated lift-propulsor system; augmentation means for the primary-powered internal flow of a ducted-airfoil wing system; substantial control of separation in the external flow by means of boundary layer control with resultant wing efficiency factors approaching unity; generation of aerodynamic lift independently of angle-of-attack by means of direct circulation control of the external flow consequent from induction and discharge, respectively, of the wing influx and efflux flow, so as to thereby minimize the operative range of aircraft pitching angles; virtual and even actual VTOL (vertical take-off and landing) performance for such aircraft while maintaining a substantially horizontal attitude throughout the climbout and landing operations, as a function of the steep-gradient criterion therefor which is effectively determined for a given aircraft configuration, by the ratio, thrust-lift/circulation-lift; avoidance of induced drag proportional to the ratio of circulation-lift/total-lift squared; attainment of high effective aspect ratios with wings of low geometric aspect ratio design; wings of greater thickness ratios for a given critical Mach speed; wings of relatively enhanced inherent beam strength; aircraft of relatively reduced size and weight for a given mission, due to the foregoing factors, also, to reduced undercarriage weight, and elimination of such items as accessory thrust reversal devices, drag chutes, after-burners and associated excess fuel, rocket and other ATO (assisted take-off) equipment; increased volumetric capacity for internal stores, fuel, cargo and passengers, despite partial use of such space for the internal flow system; abatement of jet noise level so as to fall well within limits of good-neighbor acceptability for close-in operations within populous areas; elimination of jet luminosity; coincidental anti-icing control; supersonic aircraft capable of ultra slow speed performance; boundary layer control of the transition phenomenon with resultant low-drag laminar flow at normal cruising speeds; trailing edge suction, and combination systems, energized either by the primary jet flow, compressor bleed, or other suitable power sources; rapid in-flight deceleration capability consequent from deflecting the jet with complementally decreased positive thrust and any permissible degree of negative thrust, followed by progressive increase of power whereby negative thrust, for ground use only, may comprise practically 100% thrust reversal; substantially increased inherent safety as a function of ultra slow speed and steep gradient performance, whenever desired; virtual elimination of lift or thrust disymmetry in multi-engine aircraft with one or more engines inoperative, through use of properly designed cross-over internal duct systems; enhanced operational flexibility, efficiency and safety, in the use of power, consequent from design of integrated jet-wing aircraft incorporating a greater number of smaller engines of lower unit power or thrust rating; improved propulsive efficiencies in the high speed range, due to thermal augmentation of the secondary by-pass flow by the primary hot jet; a primary-powered ejector-airfoil having optimal ejector length/depth ratio; and further objects and advantages will become more apparent as the description proceeds.

Figure 2:
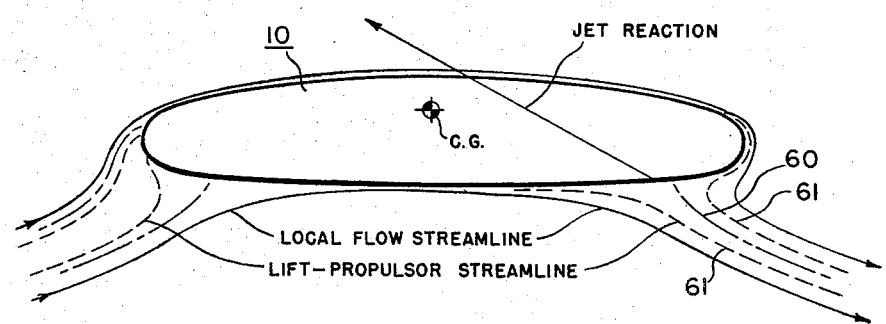
Figure 3:
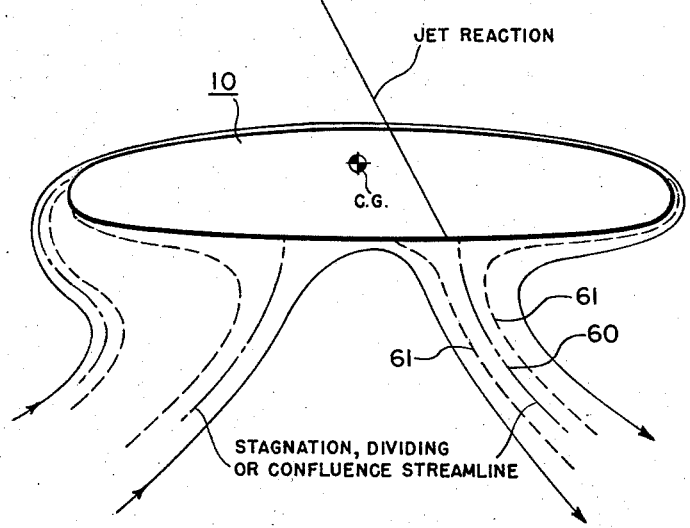

In the accompanying drawings:

In FIGS. 1, 2, 3 which follow, the free stream flow is from left to right in the drawing, and each section illustratively shown is at zero degrees angle-of-attack.

FIG. 1 represents a schematic diagram of the flow phenomena of a primary-powered ducted wing section having a leading edge jet influx and a trailing edge jet efflux, as shown for illustrative instance only in FIG. 4 to be described, and including vectorial representation of the jet reaction upon the wing section operative through a short moment arm reltaive to the C.G. of the aircraft incorporating such a wing section, for the normal high speed cruise condition, with maximal chordwise spacing between the entry and terminal stagnation stream lines.

FIG. 2 represents a similar diagram, except that the flow phenomena are those associated with an intermediate speed range, with enhanced circulatory flow about the wing section, greater effective angular deflection of the jet and the local flow downwash over the airfoil, accompanied by a more forwardly disposed effective point of application of the jet reaction, operative through a short moment arm relative to the C.G. generally similar to that of FIG. 1, with intermediate chordwise spacing between the entry and terminal stagnation streamlines.

FIG. 3 represents a similar diagram, except that the flow phenomena are those associated with ultra-slow speeds, with further enhancement of the circulatory flow about the wing section, still greater effective angular deflection of the jet and the downwash, accompanied by a still more forwardly disposed effective point of application of the jet reaction, also operative through a short moment arm relative to the C.G. generally similar to that of FIG. 1, with still further reduced chordwise spacing between the entry and terminal stagnation streamlines by which the latter approach coincidence or intersection.

FIG. 4 represents schematically an illustrative integrated jet-wing ducted airfoil chordwise section taken on a line coincident with line 4—4 of FIG. 6, including an internally disposed turbofan compound power plant, dual trailing edge controllable efflux slots, shown as providing an upper surface jet discharging in the direction of the circulation about the airfoil and a lower surface jet discharging in opposition thereto, as adjusted to provide flow phenomena generally similar to those of FIG. 1, but selectively operable to effect reversal of the lower surface jet so as to discharge both trailing edge jets in the direction of the circulatory flow, as shown in FIG. 5, to be described, an additional controllable slot forwardly disposed from the trailing edge slots disposed in the lower surface for selectively providing a jet in opposition to the circulatory flow as augmented by the two trailing edge jets, so as to establish an effective fluid-flap with resultant flow phenomena generally similar to those of FIG. 2 or 3, depending upon the relative momentum of the respective jets. This figure also incorporates a valve, for closure of the power plant duct when the engine is inoperative, and a porous-type wing skin for automatic removal of the deenergized boundary layer flows from the upper and lower airfoil surfaces consequent from the self-induced pump action supplied by the kinetic energy of the trailing edge jets.

FIG. 5 represents schematically a fragmentary section of the trailing edge of FIG. 4, with the slots adjusted so that both rearwardly-disposed jets discharge in the same direction as the circulatory flow, to maintain attached flow over the rounded terminal end of the airfoil whereby a wide range of circulation control effect and approximately 180° thrust reversal or practically any intermediate complemental thrust effect can be secured as desired.

FIG. 6 represents a spanwise fragmentary section of the upper surface of the airfoil of FIG. 4, taken on line 6—6 thereof, illustrating schematically the sandwich skin construction wherein the outer pervious layer is comprised of multiple chordwisely-extending parallel channels, closed internally by an impervious inner layer, and which channels communicate through the pervious surface with the external ambient boundary layer flow.

FIG. 7 represents a schematic fragmentary section of an alternative type of nose entry for an airfoil, illustratively comprising a modification of FIG. 4, providing upper surface leading edge flow separation control by means of a sandwich section of wing skin, similar to such structure shown in FIGS. 4 and 6, in communication with an injector slot in the throat of the nose entry section which provides optimum flow control when the maximum influx velocity ratios obtain at the minimum speed of the aircraft, and a lower adjustable entry lip for the nose section to provide optimum influx conditions at all operating speeds, altitudes and power settings.

FIG. 8 represents schematically a typical integrated jet-wing ducted airfoil section wherein a wing ejector system is comprised essentially of dual nose entry ducts for spanwise transport and chordwise discharge of the primary jet efflux flow which is normally discharged internally of the airfoil for induction of a secondary flow with resultant mixed flow augmentation within the ejector but which primary flow may alternatively also be partially discharged externally over either the upper or lower leading edge sections of the airfoil so as to control flow separation thereover as may be required at high positive or negative angles-of-attack respectively, the nose entry ducts also being designed for thermal anti-icing control, and with an adjustable trailing edge slot and a lower surface jet reaction control flap whereby the primary-powered mixed flow jet efflux selectively may be directed rearwardly for maximum thrust, or over the rounded terminal end of the airfoil and forwardly downwardly and rearwardly over its lower surface against the deflected flap which has a reflexed trailing edge so as to provide the dual direct-lift effects of jet reaction thrust-lift and jet induced circulation-lift together with complemental thrust effects and relatively low resultant pitching moments on the airfoil.

Figure 9:
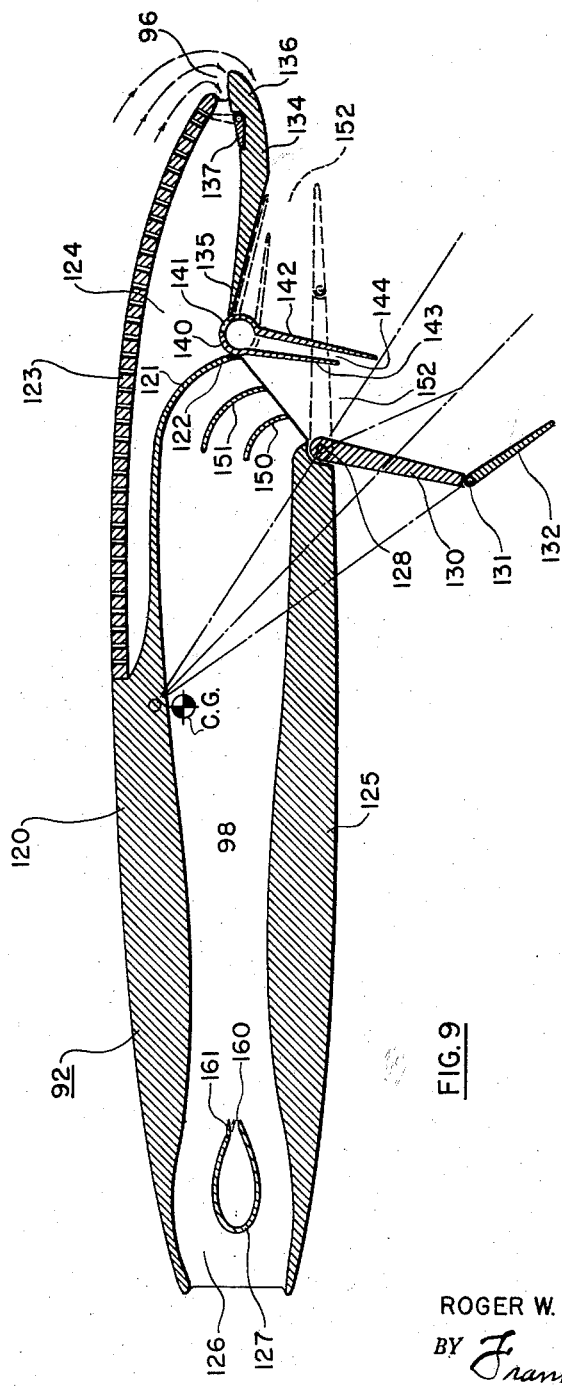

FIG. 9 represents a longitudinal section through an airfoil according to one form of the invention, primarily showing the internal aerodynamic ducts of the airfoil, one of which communicates with a pervious section of the upper surface to provide boundary layer control and also with a trailing edge suction slot provided with a shut-off valve for circulation control, the other ducts (with the exception of the compressor bleed duct) comprising the ejector system with coincidental self-induced pump action for the first mentioned duct wherein deflection of the main flap and the reflexed trim flap maintains substantially coincident reaction from the jet proximate to the C. G. of the aircraft.

Referring to FIG. 4, a form of integrated jet wing 10 is disclosed comprising the upper wing portion 11, having the leading edge lip 12, and the lower wing portion 13, having the leading edge lip 14, with the respective lips in spaced relation to define an influx entry passage 15, leading into the power plant duct 16, internally defined by the upper and lower wing portions 11 and 13, and such generally vertical chordwise members 29 as may be found expedient which portions and members converge rearwardly into a cylindrical duct extension 16'. The power duct 16 and extension 16' house a primary power source such as the flow-augmenter turbofan unit 7, of which any desired number may be used, spanwisely spaced in individual power ducts 16 and 16' as may be required in particular aircraft designs. Each power duct 16 and extension 16' communicates rearwardly with common plenum chamber 19, which preferably extends throughout somewhat greater wing span than the maximum spacing of power plants. A valve 8 is provided in duct extension 16' which can be moved to shut off the flow through duct 16 when the instant turbofan is out of operation, so as to prevent back-flow from the other power units through any power-inoperative duct.

In the preceding description of an internal flow system utilizing turbofan primary-power units, it will be understood of course, that any other suitable power source capable of energizing the ducted flow may be used, whether turbo-jet ejector combinations, ducted turbo-props, other propellered engines, rocket engines, or other suitable types of jet power plants, or the like.

Still referring to FIG. 4, a substantial rearward extent of upper portion 11 is formed of a sandwich skin structure comprising the impervious inner surface 17 on which is superposed a pervious layer 20, having a plurality of chordwisely-extending parallel inner channels 21, closed inwardly by the impervious layer 17, as shown in FIG. 6, and with a multiplicity of outer pores or small apertures 22 extending between the respective channels and the outer surface of the wing. The trailing edge of the sandwich skin structure comprises a spanwisely-extending flap 18 pivoted at 18'. The channels 21 discharge adjacent to the free edge of the flap 18 and adjacent to the forward edge thereof channels 21 may have greater depth to essentially avoid misalignment when flap 18 is deflected. A substantial rearward extent of lower portion 13 is also formed by an inner impervious layer 25 which is covered by a pervious layer 27 similar to the upper layer 20. The lower sandwich skin structure terminates at the trailing edge in a slot-defining lip 26, and the channels thereof discharge adjacent to the tip of the lip 26. The inner impervious surfaces 17 and 25, together with slot-defining and controlling means to be described, essentially define the common plenum chamber 19. A fixed curved slot element 30, tapered in section, forms a rounded trailing edge of the airfoil, and its thickened upper and forwardly projecting portion 31 completes with flap 18 the definition of an upper slot 32, which is generally rearwardly directed. The jet discharging therethrough from the plenum chamber 19 is accordingly aligned with the circulation over the airfoil which is augmented by adherence of the jet to the rounded trailing edge 30, as is controlled through adjustment of flap 18 according to operating requirements. An adjustable curved valve element 33 is provided movable about the pivot 34. In the position shown in FIG. 4 the valve 33 is disposed in its upper high speed adjustment to provide maximum thrust whereat its lower curved portion 35 is in spaced relation to the trailing edge lip 26 of the lower portion to define therewith a slot 36. The jet from plenum chamber 19 discharging through slot 36 is directed generally rearwardly in opposition to the circulatory flow over the airfoil which, as noted, would otherwise be augmented by the efflux from upper slot 32. Thus the jets from slots 32 and 36 diffuse rapidly without separation to provide corresponding pressure recovery over terminal end 30, and impinge along the confluence streamline 60 indicated in FIG. 1, thereby fixing the rear stagnation point at the juncture of streamline 60 with the airfoil and thus maximum spacing from the front stagnation points, and stabilizing the circulation over the airfoil by the functionally-equivalent effectively-sharp and fluid-extended trailing edge contained within the lift-propulsor jet streamlines 61—61 appreciably downstream of the airfoil. Consequently, the thrust from these impinging jets reacts upon the rounded terminal end 30 of the airfoil and forwardly towards the leading edge on an effective line relatively close to the C.G. of the aircraft. As the valve element 33 moves downwardly about its pivot the slot opening 36 is decreased, to vary the effectiveness of the jet issuing therefrom. However when the valve 33 is moved to its lower limit, as shown in FIG. 5, the advancing end 35 thereof moves forwardly into substantial contact with the lower lip 26, thus closing off the lower slot 36. Simultaneously however the upper end of the valve 33 has moved away from the curved fixed member 30 to define therewith a generally-reversed lower slot 37 of relatively large opening directed downwardly and forwardly along the lower surface in the direction of the circulation over the airfoil to effect a substantial 180° thrust reversal. Concurrently flap 18 is deflected to appreciably decrease slot 32 so as to maintain attached flow over the full extent of curved element 30. At intermediate positions of valve 33, both slots 36 and 37 will be partially open whereby the jets issuing therefrom will define a deflected fluid-flap in effect.

A lower surface vane 40 is provided well forward of the trailing edge pivoted to lower portion 13 at 39. Vane 40 is ordinarily closed for the normal high speed operating range so that no slot is formed in the lower portion of the airfoil when the trailing edge slot organization is disposed as shown in FIG. 4. This is indicated by the full line position of vane 40 in this figure. However when the trailing edge blowing jet circulation flow control system is adjusted as shown in FIG. 5, vane 40 is moved to the dotted line position indicated in FIG. 4, to provide slot 49 formed in conjunction with the forward terminus of the lower sandwich skin structure. The rearwardly projected jet issuing therefrom is accordingly directed in opposition to the rear jets and the augmented circulatory flow about the airfoil consequent from the FIG. 5 high-lift slot organization, so as to provide a fluid-flap which reacts substantially forward on the lower surface throughout a wide selective range and which is effective to stabilize the circulation and to control its magnitude according to the momentum of the respective jets, as is generally indicated by FIGS. 2 and 3. The large forward travel along the lower surface of the terminal confluence streamline and its associated rear stagnation point accompanied by related increase in the effective angular deflection of the jet and the local flow downwash, not only maintains an effectively short moment arm between the line of the jet reaction and the C.G. of the aircraft as shown by the progressive changes from FIGS. 1 to 2 to 3, but also entirely avoids the limitations of the conventional sharp-trailing-edge airfoil, by directly generating essentially potential flow phenomena, as controlled by the jets independently of angle-of-attack, generally similar to Magnus-type circulation with a rotating cylinder, which approaches ideally the optimum circulatory flow situation wherein the entry and terminal stagnation streamlines actually intersect to establish a single detached stagnation point below the airfoil proximate to a line normal to the airfoil midchord. Such optional circulatory flow effects are attained integrally and as a function of maximum effective angular deflection of the jet, and since the centers of pressure upon the airfoil from the respective jet induced circulation-lift and from the jet reaction thrust-lift are inevitably maintained generally coincident by the foregoing recited structure, throughout the range from the maximum thrust effects of FIG. 1 to the substantial dual direct-lift effects of FIG. 3, there are accordingly no practical longitudinal-trim limitations upon the ultra slow speed capabilities with integrated jet-wing aircraft having an airfoil similar to that of FIG. 4, including tailless configurations thereof.

Since, as is evident from the diagrams of FIGS. 1, 2 and 3, and the structure of FIG. 4, the magnitude of the circulation about the airfoil may be directly controlled by the jets independently of incidence, it inevitably follows that it will be desirable to operate aircraft incorporating such airfoils of the integrated jet-wing type on steep gradient flight paths in a substantially horizontal attitude, with resultant high negative angles-of-attack during climb-out following take-off and large positive incidence during the approach maneuver for landing, especially for such operations within restricted urban areas. To avoid the leading edge flow separation and wing stall phenomena normally associated with these large angles-of-attack, the modified upper nose entry structure of FIG. 4 shown in FIG. 7, may be utilized, as illustrative of automatic boundary-layer control suction means which are applicable to the lower as well as to the upper lip. In this figure the upper portion 11 has a leading edge lip section 50, comprised of a pervious sandwich skin structure similar to those of FIGS. 4 and 6, previously described, and an injector slot connected to the discharge outlets of the sandwich skin channels. The leading edge lip section is comprised of the inner impervious portion 51 and the curved impervious leading edge slot 52, defining with portion 51 the injector slot 53 opening into the entry 57. The sandwich is completed by a pervious outer layer 54 disposed on portion 51, respectively similar to layer 20 on portion 17 of FIG. 6, having chordwise channels forwardly discharging into the injector slot 53. The lower portion 13 has a leading edge lip section 55 pivoted at 56 to controllably vary the width of the entry 57, to provide optimum influx conditions at all operating speeds, altitudes and power settings.

For the operating conditions involving high negative angles-of-attack, the lip element 55 will be formed as a reversal of the upper lip organization shown in FIG. 7, with the pervious surface of the sandwich structure forming the external surface thereof, so as to provide control of separation over the lower leading edge lip section. This is not shown, but is considered to be fully obvious. In either case the automatic suction pump action inwardly through the pervious surface, is most effective in maintaining attached local flow externally over the respective leading edge lips at the lowest air speeds, since the influx velocity ratios of the flow in the throat of entry 57 relative to the free-stream velocity, will then be maximal, for a given power output, and thus optimum favorable relative pressure differentials will prevail across the injector slot system.

The illustrative integrated jet-wing airfoil section shown in FIG. 8 provides blowing jet means for control of flow separation over either the upper or the lower leading edge portions with additional circulation control effects if desired, as well as providing the principal functions generally similar to those of the FIG. 4 airfoil, and other important functions. In this figure the airfoil 58 is comprised of an upper portion 59, having a forwardly disposed spanwise duct 62, supplied by primary-powered fluid efflux flow from a power plant source not shown, but which is contained within the engine nacelle 69. Illustratively a gas dynamic power source for duct 62 may be supplied. The duct 62 has a forward discharge passage 63 in juxtaposition to the rear concave surface 64 of a spanwisely extending adjustable flow guiding nose element 65, controllably tiltable about an axis 66, whereby passage 63 and convex surface 64 together define a rearwardly-directed slot or slots for internal jet discharge, either internally alone as the principal function of such a slot or with alternative partial external discharge over upper portion 59 as the supplemental combined function of such slots. A complemental lower airfoil portion 67 has a forwardly disposed spanwise duct 68, also supplied by primary-powered and preferably gas dynamic efflux flow, and has a forward discharge passage 70 in juxtaposition to the rear convex surface 71 of a spanwisely extending adjustable flow guiding nose element 72, controllably tiltable about an axis 73, the duct 68 organization likewise providing the principal internal and supplemental external slots similar to those of the duct 62 organization. The portions 59 and 67 are spaced apart to define an internal ejector passage 74 substantially coextensive with the full-chord length of airfoil 58, comprising entry, mixing chamber and diffuser sections thereof, as is well understood in the art.

The airfoil 58 has a convergent open terminal end defined by the sharp trailing edge curved lip 75 on the upper portion 59, and by the reflexed sharp trailing edge 76 of the spanwisely extending flap 77, pivoted to the lower portion 67 at 78, flap 77, in the full line retracted position shown being disposed in the normal high speed organization of lower portion 67. In operative association with curved lip 75 of the upper portion is the movable upper nozzle element 80, curved and tapered in section, and pivoted relative to airfoil 58 on an axis 81, carried by rib 69' which effectively comprises a continuation of engine nacelle 69. A smaller lower nozzle element 82, also curved and tapered in cross section is pivotally mounted, for convenience coaxially on pivot 81. Nozzle elements 80 and 82, and sharp trailing edges 75 and 76, are coextensive with flap 77 over any desired and suitable portion of the wing span. Elements 80 and 82 are mutually so related as to define primary jet nozzle 83, generally rearwardly directed in the full line position herein shown, whereby the jet efflux therethrough issuing from ejector 74 completes with the previously recited structure the high speed organization of airfoil 58, as terminated by an effectively-elongated sharp amorphous trailing edge which effects stabilized circulation thereover similar in result to that diagrammatically illustrated in FIG. 1 and previously described, except for the detail flow phenomena distinctions incident to attainment of such a result with a single trailing edge jet. Elements 80 and 82 are preferably independently adjustable so that the width of nozzle 83 may be varied to most effectively match operating requirements for optimum thrust under all conditions of ambient air speed and power.

Normally the nose entry flow guiding elements 65 and 72 are so tilted that the entire rearward primary jet discharge from both ducts 62 and 68 is directed internally into the entry of ejector 74, with consequent entrainment of large volumes of secondary airflow and subsequent mixed flow augmentation which is delivered as increased momentum of the jet efflux from nozzle 83. Where required in some types of multi-engine installations, rib 69' can obviously be opened up so that preferably the after part of the ejector diffusor section would communicate with a spanwisely-extensive plenum chamber, similar to such provision in the airfoil of FIG. 4.

In order to prevent leading edge separation incident to high positive or negative angles-of-attack, either of the flow guiding nose elements 65 or 72 may be so tilted as to discharge a relatively small portion of the jet efflux from the respective ducts 62 and 68 rearwardly over the adjacent external surfaces of airfoil 58. In the disclosure of FIG. 8, the lower nose element has been so adjusted that the jet efflux discharges over both the internal and external surfaces of the lower portion 67, as indicated by the arrows, such as might be required to prevent a negative wing stall in a level attitude steep gradient climbout maneuver, for instance. Conversely, on a steep gradient landing approach flight path, upper nose element 65 would be similarly adjusted to provide dual efflux slots to prevent a positive wing stall, with only the internal slot of lower element 72 operative in this case.

Respecting the matter of providing the high-lift-with-low-moment flow phenomena and the complemental thrust effects generally similar to those depicted diagrammatically in FIG. 2 or FIG. 3, the flap 77 is deflected downwardly on its pivot 78 through various angles according to requirements, then nozzle elements 80 and 82 are rotated clockwise (as viewed in FIG. 8) on their common pivot 81 to the dotted line position shown in which the nozzle 83 effectively provides substantially 180° reversal of the jet relative to the direction thereof obtaining with the full line position shown. Simultaneously, an upper surface relatively narrow slot 83' generally rearwardly and downwardly directed, is opened up between upper nozzle element 80 and upper curved lip 75, as shown by the respective dotted and solid line representations thereof, such that the thin jet efflux from this upper slot 83' follows the outer surface of element 80 without separating therefrom because the momentum of the thin jet is predeterminedly contained within the critical flow break-away limit thereof for the particular effective curvature, thus maintaining attached local flow over this rounded trailing edge which is provided for the low speed organization of the airfoil 58, with concurrent augmentation of the circulation thereover as a function of the momentum of this thin upper surface jet. The attainment of the rounded trailing edge flow phenomena of the invention, as recited above, is also characteristic of the FIG. 5 organization. The thin jet and attached local flow thus merge with the preponderant jet efflux from primary nozzle 83 and these composite flows are together projected forwardly along the lower surface towards impingement against flap 77 which, due to its reflexed trailing edge, consummates essentially double reversal of the trailing edge flow, when flap 77 is deflected as shown by the dotted lines of FIG. 8 with resultant flow phenomena generally corresponding to those diagrammatically illustrated by FIG. 2. For flow phenomena approaching those of FIG. 3, flap 77 is deflected somewhat beyond the dotted line position shown.

Referring particularly to FIG. 9, the ducted wing 92 is comprised of an upper portion 120 having a chordwisely intermediate and generally rearward internal extension curving downwardly as at 121, with termination thereof in lower edge 122 within the airfoil. An appreciable chordwise extent of the upper portion 120 is comprised toward the trailing edge of a porous wing skin 123 spaced from and forming in part with extension 121 a suction chamber 124. The wing 92 is further comprised of the lower portion 125 spaced from the upper portion 120 to define together with suitable chordwise duct walls, an internal chordwisely extending ejector duct passage 98, comprising successively, secondary flow entry, mixing, diffusor, flow-turning vanes and nozzle-flap sections, to be described. The leading edge of wing 92 has nose influx entry 126, and primary jet efflux duct 127 having jet nozzle 160 in the entry section of ejector passage 98. Nozzle 160 has adjustable lip 161. Flow directing vanes can, of course, be provided within nozzle 160, so as to direct the efflux flow therefrom substantially chordwisely. The primary jet efflux nozzle 160 is adjusted by lip 161 to provide optimal efflux velocities for particular operating conditions.

Toward the rear of the wing the lower portion 125 supports main flap 130 on pivot 128 and at the trailing edge of the main flap a reflex flap 132 is mounted on pivot 131, these flaps together comprising the lower part of the nozzle-flap section of ejector 98. It will be understood that main flap 130 may be adjusted through various angles, between the lower high-lift position shown in full lines and the upper high-speed position shown in dotted lines, with simultaneous related adjustments of the reflex flap 132 on its pivot 131, as required to maintain substantially throughout the deflected operating range of the respective flaps, generally coincident reaction from the jet proximate to the C.G. of the aircraft or practically constant moment arm therebetween, according to design in particular cases, as shown by the three center lines extending through a common point form the corresponding flap positions. Effectively, therefore, the jet reaction moves forward progressively on the airfoil as its angular deflection is increased, as is also diagrammatically illustrated by the successive jet reaction changes of FIGS. 1, 2 and 3.

A lower surface complemental airfoil portion 134 comprising an effective upper extension of the nozzle-flap section of ejector 98 in the high speed organization thereof, extends chordwisely from its forward end at 135 toward a trailing edge lip 136, projecting rearwardly slightly beyond and in spaced relation below the rear terminal end of the upper surface porous skin structure 123 to define trailing edge suction slot 96. When slot 96 is inoperative, the trailing edge of the airfoil is effectively sharp. A shut-off valve 137 is spanwisely coextensive with slot 96 and pivotally mounted on lower complemental portion 134, arranged for high-lift effects in the open operative position of slot 96 in the full lines shown, to provide as a function of relatively reduced pressure within suction chamber 124, circulation control over the resultant effectively rounded trailing edge of the airfoil, such function being indicated by the flow lines shown, successively comprising in the downstream direction, an entering suction streamline, the rear stagnation dividing streamline, and an external local flow streamline passing around the trailing edge and forwardly along the lower surface of complemental lower portion 134. For the high speed condition the valve 137 is closed, as shown in the dotted line position. The relatively reduced pressure in suction chamber 124, to be described, effects continuous boundary layer control through upper porous wing skin 123, irrespective of the position of the valve 137.

An annular hollow valve member 140 spanwisely extensive and having an opening 141 in communication with suction chamber 124, is journalled for pivotal movement in effectively sealed contact with and between the terminal end 122 of the intermediate curved extension 121 and the forward end 135 of the complemental lower portion 134, and with the latter completes the definition of suction chamber 124. Extending from and relatively fixed to annular valve member 140 are spaced guide vane members comprising the upper part of the nozzle-flap section of ejector 98, consisting of the shorter inner vane member 143 and the longer outer vane member 142 forming therebetween the injector slot 144 in communication with the interior of valve 140 and, at its terminal end, with the nozzle-flap efflux slot 152. This valve-vane combination is independently controllable with respect to main flap 130 and reflex flap 132 whereby efflux slot 152 is adjusted to provide maximal velocities of the mixed-flow jet issuing from the nozzle-flap section of ejector 98. As shown in the full line high-lift position the nozzle-flop is adjusted for maximum width of efflux slot 152 to accord with full power output, with resultant flow phenomena generally similar to those of FIG. 3, whereas the dotted line position thereof illustrates the narrow gap of slot 152 as adjusted for cruise power operation, and resultant flow phenomena generally similar to those of FIG. 1. It will be understood that the respective elements of the nozzle-flap can be relatively adjusted to provide variable geometry control of slot 152 for various combinations of power-speed-altitude operation substantially throughout its range of angular deflection.

In order to accomplish a wide range of angular deflection of the nozzle-flap without separation of the internal flow, curved flow-turning vanes 150 and 151 are provided in the rear of the diffusor section of ejector 98.

At all angular deflections of the nozzle-flap combination the low pressure induced by the high velocity jet efflux from slot 152 provides automatic induction of the flow from suction chamber 124 through the injector 144. Since the jet efflux velocity in slot 152 is higher at all times, power-on, than the external local flow velocity over porous surface 123 and at trailing edge slot 96, the power-induced pressure differentials across the suction pump system are always favorable.

In operating integrated jet wing aircraft for take-off the nozzle-flap system will be deflected as shown in full lines in FIG. 9, with the functional effects indicated by FIG. 3, provided the momentum of the mixed flow jet is high relative to the gross weight of the airplane, in which case only a very short take-off run would be required, or none at all, if the above identified specific thrust ratio of the jet is somewhat greater than unity. At lower values of the specific thrust ratio, as would usually be the case, the nozzle-flap system would be deflected to some intermediate position for take-off with resultant functional effects generally as indicated by FIG. 2, whereby the residual thrust effects would be sufficient to overcome the higher induced drag associated with the relatively higher circulation-lift that is required when less thrust-lift is available. Obviously greater take-off run will be required in the latter case for the condition of lower power available, whether due to single engine operation of a dual engined aircraft, or to lower original design power available. The same situation likewise determines the flight-path gradient for the climb-out maneuver, i.e. the steepness of the flight path is related to the excess power available for climb. Complementally with use of the primary-powered integrated jet-wing airfoil system of the invention, during the take-off and climbout maneuvers, the valve 137 is open to provide additional circulation control through suction slot 96.

After leveling-off at cruising altitude for normal flight operations the nozzle-flap system will be retracted to its high speed operating position as shown by dotted lines in FIG. 9, the valve 137 will be closed to shut off the suction slot 96, with resultant flow phenomena generally similar to those of FIG. 1. For the approach and landing maneuvers the above recited take-off and climb-out procedures will apply except as regards the degree of nozzle-flap adjustments as related to power output which it may be desirable to use.

Following touch-down, it will be apparent that thrust reversal in practically any degree desired, is inherently available operationally in the integrated jet-wing airfoils as herein disclosed or by slight modifications thereof, without involving any accessory devices whatever. With the FIG. 4 airfoil system adjusted as shown in FIG. 5, vane 40 can of course be closed immediately upon landing, whereby the jet efflux will discharge forwardly over the full extent of the lower surface. To somewhat lesser extent, the flap systems of FIGS. 8 and 9 can be arranged for almost any degree of forward deflection, so as to quickly reverse thrust at full power output, for those aircraft where such a need exists.

It should be clear from the foregoing recitation of structure and functions relating to integrated jet-wing airfoils pertaining to the two-dimensional flow case, as illustratively but not limitatively depicted by FIGS. 1 to 9 inclusive, that when such airfoils are combined in a complete system for the three dimensional case of a fully integrated jet-wing airplane, certain additional inherent functional advantages become available in such type aircraft, among which may be emphasized: (1) the powerful lifting vortex generated over the central portion of the wing span by the integrated jet-wing airfoil and that over the swept wing tip portions by the supplemental leading edge blowing jets, interact three-dimensionally for mutually augmented circulation effects; (2) the facility herein disclosed for designing integrated jet-wing airfoils of very low-moment and even essentially zero-moment characteristics, permits the design of practical tailless aircraft incorporating such airfoils, which contrasts sharply with the impracticability of such designs incorporating the primary-powered jet flaps of the prior art which admittedly require an outsize horizontal tail to trim out the large pitching moments they engender; (3) a further by-product of the low-moment phenomena is the fact that there is no limit, practically speaking, to the permissable momentum of the jet which can be made available with very high-powered integrated jet-wing aircraft, therefor permitting VTOL performance, if desired, and steep gradient flight paths as a function of the ratio of thust-lift/total-lift in any case; (4) the induced- drag-avoidance factor consequent from effectively unloading the wing by the relative amount of the thrust-lift to the total lift, thereby providing what is tantamount to very high effective aspect ratios with wings of very low aspect ratio designed.

It will be understood that the several forms of the integrated jet-wing herein disclosed, are purely illustrative of the principles of the invention to attain certain desired characteristics, and by no means should the precise configurations of the instant drawings be taken to limit the wide range of possible applications of such principles which will now be apparent. For instance, alternative to the trailing edge suction slot of FIG. 9, the rounded terminal blowing jet system of FIGS. 5 and 8 could be adapted to and combined with the FIG. 9 nozzle-flap organization. Or the porous upper surface of FIGS. 4 or 9, could be continued through a rounded trailing edge and likewise organized with the nozzle-flap system of FIG. 9, to provide functionally-sharp terminal flow phenomena at high speeds and of course, attached flow over the rounded end of the airfoil at low speeds. Similarly, the compound nozzle-flap of FIG. 9 could be applied to either the FIGS. 4 or 8 type airfoils, while the latter integrated jet-wings as shown, could be substituted for the FIG. 9 organization. As a further detail airfoil modification, the FIG. 9 type airfoil could have the treatment relating to leading edge separation flow control and variable influx area, generally similar to that indicated by FIG. 7 and the specification pertinent thereto. As is well understood in the art, other area suction methods of boundary layer control, as by means of bleeder slots or slits and by distributed multiple bleeder holes, may alternatively be substituted as full functional equivalents of the porous or pervious surfaces herein specified.

I claim as my invention:

1. A jet-wing having suction means effective to control the boundary layer and circulatory flows thereover and having an aerodynamic center, adjustable nozzle means in said wing, duct means within said wing transmitting pressurized fluid flow to said nozzle means to effect jet discharge therefrom at various angles relative to said wing from generally rearward to generally downward, and jet reaction control means associated therewith and selectively operative and effective relative to said nozzle means to maintain the reaction from said jet discharge at an essentially constant moment arm relative to said center irrespective of changes in said angles including means to deflect said downward jet discharge more rearwardly.

2. A jet-wing as in claim 1, and power means common to said jet discharge and said suction means.

3. An integrated jet-wing operatively related to an aircraft center of gravity, said jet-wing being further operatively characterized by directly powered and concomitant jet-reaction lift and thrust and jet-induced circulation lift effects thereon with resultant pitching moments therefrom relative to said center of gravity, said wing comprising upper and lower surfaces at least partially enclosing an internal spanwisely disposed duct for transporting fluid flow, and having a trailing edge section, suction means in said upper surface and partially in said trailing edge section effective to control the boundary layer and circulatory flows over said wing, power means communicating with said duct for effecting pressurized fluid flow therein and jet discharge thereof from said wing, adjustable nozzle means communicating with said duct controlling the mass flow rate of said jet discharge and the direction thereof relative to said wing between generally chordwisely of said trailing edge section and generally at least normal to said chordwise flow, and jet-reaction control means complemental to said nozzle means and interposed between said jet discharge and the adjacent upstream local flow over said wing and selectively operative with said nozzle means when said jet discharge is directed toward said jet-reaction control means to effect diversion of said jet discharge with corresponding angular control of said reaction effects within predetermined limits, said nozzle means and said jet-reaction control means having a first relative adjustment wherein the jet reaction depends primarily upon the adjustment of said nozzle means and is generally forward upon said wing and proximate to said center of gravity and a second relative adjustment wherein said jet discharge is directed toward said jet-reaction control means and said jet reaction is diverted thereby generally upward and forward and proximate to said center of gravity, whereby said pitching moments from said lift and thrust effects are maintained substantially constant in both of said adjustments.

4. An integrated jet-wing as in claim 3, wherein said nozzle means are disposed in the trailing edge region of said airfoil.

5. An integrated jet-wing as in claim 3, wherein said airfoil has a rounded trailing edge and said nozzle means are disposed adjacent thereto.

6. An integrated jet-wing as in claim 3, wherein said nozzle means are substantially disposed in the trailing edge region of said airfoil in said one adjustment and move downwardly and forwardly in said second adjustment.

7. An integrated jet-wing as in claim 3, in which said jet-reaction control means is coextensive with and forms a part of said nozzle means.

8. An integrated jet-wing as in claim 3, in which said jet-reaction control means effect a supplemental jet discharge impinging against the jet discharge from said nozzle means in said second adjustment.

9. An integrated jet-wing as in claim 3, in which said jet-reaction control means comprises a trim flap effective to control said pitching moments.

10. An integrated jet-wing as in claim 3, in which said jet-reaction control means comprises a compound double-hinged flap having a forward portion and a trailing edge portion in which said latter portion is reflexed upwardly relative to said forward portion in said second adjustment.

11. An integrated jet-wing as in claim 3, in which said jet-reaction control means is in the lower surface of said wing.

12. An integrated jet-wing as in claim 3, in which said nozzle means and said control means have a range of relative adjustments between said first and said second adjustments, and said jet reaction remains proximate to said center of gravity and said pitching moments are maintained substantially constant throughout said range.

13. An integrated jet-wing as in claim 3, in which the jet discharge in said second adjustment is initially downwardly and forwardly and is finally redirected downwardly and rearwardly by said jet-reaction control means.

14. An integrated jet-wing as in claim 3, in which said duct has an upstream opening and chordwise extent to comprise a ducted airfoil, for transporting aerodynamic flow toward said nozzle means.

15. An integrated jet-wing as in claim 3, in which said nozzle means comprise a fixed curvilinear element defining with the upper surface of said wing a rearward nozzle and spaced from the lower surface of said airfoil to define an opening, and a curvilinear valve member juxtaposed to said element and to said lower surface and movable between one setting thereof of substantial housing within said element to expose said opening and together with said lower surface define a rearwardly-directed nozzle, and another setting of said valve member away from said element to modify said opening and together with said element define a generally forwardly-directed nozzle.

16. An integrated jet-wing as in claim 3, in which said nozzle means comprise plural curvilinear adjustable elements wherefrom said jet discharge impinges forwardly toward said jet-reaction control means in said second adjustment.

17. An integrated jet-wing as in claim 3, in which said nozzle means comprises a pair of spaced concavo-convex elements pivoted on said wing and defining between them a nozzle.

18. An integrated jet-wing as in claim 3, in which said nozzle means comprise plural jet discharge nozzles.

19. An integrated jet-wing as in claim 18, in which one of said nozzles is in the upper surface and another is in the lower surface of said airfoil and in said first adjustment both said nozzles are directed to effect rearward jet discharge and stabilized circulation flow of relatively low magnitude about said airfoil, and in said second adjustment the jet discharge from said lower surface nozzle is directed generally forwardly and downwardly and is redirected downwardly and rearwardly by said jet-reaction control means and the jet discharge from said upper surface nozzle maintains effective attachment of relatively high magnitude circulatory flow over said trailing edge with ultimate mergence of said latter flow with the jet discharge from said lower surface nozzle.

20. An integrated jet-wing as in claim 3, wherein said jet-reaction control means are independently adjustable to vary said pitching moments to provide aircraft control effects.

21. A jet-wing having primary powered jet discharge concomitantly productive of propulsion and direct-lift effects upon said wing, said wing having suction means effective to control the boundary layer and circulatory flows thereover energized by said primary powered jet discharge, controllable nozzle and complemental jet-reaction control means on said wing mutually effecting selectively substantially linear jet discharge for primary thrust effects and reflexed-angle jet discharge for primary lift effects throughout an angular range of said jet discharge from generally rearward to generally upward relative to said wing, whereby the jet reaction is maintained proximate to a predetermined reference point on said wing throughout said range of jet discharge with maintenance of a substantially constant effective moment arm relative to such point.

22. A primary powered airfoil having an entry upstreamwardly directed and forwardly disposed in the leading edge region thereof, means defining a directionally adjustable nozzle-shaped discharge slot disposed rearwardly in said airfoil, an internal passage in said airfoil communicating with said entry and said slot for transporting jet lift and propulsive flow through said slot as a jet discharge of variable direction, primary power means to energize said flow, suction means on said airfoil energized by said flow effective to control the boundary layer and circulatory flows over said airfoil and jet-reaction control means complemental to said slot reflexing the discharge from said slot when the latter is directionally forward and inoperative when the discharge from said slot is directionally rearward to so direct said jet discharge as to provide a range of jet reactions respective lift/thrust effects on said airfoil without appreciable change in the resultant pitching moments on said airfoil.

23. A primary powered ducted airfoil having a leading edge entry and a communicating rearwardly disposed jet discharge passage, said entry comprising spaced upper and lower surface forwardly open primary flow ejector ducts communicating with power means for transport of gas dynamic flow therefrom and including selectively adjustable leading edge nose sections for each of said ducts having rearwardly facing generally concave surfaces juxtaposed to the respective ducts comprising primary dual delivery nozzle elements and ejector means of said ducts, whereby pursuant to adjustments of the nose sections gas dynamic flow is alternatively selectively discharged entirely internally into said passage or partially therein with residual discharge externally over one at least of said surfaces to control local flow separation thereover.

24. An integrated jet-wing having a duct transporting pressurized flow, suction means on said jet-wing effective to control the boundary layer and circulatory flows thereover adjustable nozzle means rearwardly disposed in said wing communicating with said duct for effecting jet discharge from said nozzle means at variable angles relative to said wing, controllable jet-reaction reflex means on said wing upstreamwardly of said nozzle means, said nozzle means and said jet-reaction reflex means coacting to establish jet thrust reaction lines against said wing having substantially the same proximate relation to a given point on said wing in all conditions of relative adjustment of said nozzle means and said jet-reaction reflex means.

25. An integrated jet-wing having a duct transporting pressurized fluid flow, suction means on said jet-wing effective to control the boundary layer and circulatory flows thereover adjustable nozzle means communicating with said duct controlling the direction of discharge of said flow, and jet-reaction reflex means complemental to said nozzle means in certain of the adjustments of the latter, said nozzle means and said jet-reaction reflex means having a relative mutual setting in which the jet efflux is generally rearwardly directed and the line of thrust thereof is generally parallel to the wing chord and proximate to a given point on the wing so as to have a known moment arm relative thereto, and said nozzle means and said jet-reaction reflex means having another mutual setting in which the jet efflux is reflexed and is rearward and downward so that the line of thrust is generally transverse of the wing chord line proximate to the same said point so as to have the same known moment arm relative thereto.

26. A ducted airfoil formed by upper and lower surfaces comprising an entry passage and a trailing edge section and operatively characterized by external boundary layer and lift-productive circulatory flows over said airfoil and by internal lift-propulsor flow therethrough, power means communicating with said entry passage to augment the momentum of said internal flow, said section comprising suction means communicating with one of said surfaces and effective to control said circulatory flow over said airfoil and said boundary layer over at least one of said surfaces, said section further comprising adjustable efflux means communicating with said entry passage and with said suction means for jet discharge of said internal flow at various angles relative to said airfoil, and adjustable jet reaction control means functionally complemental to said efflux means and effective in at least one respective adjustment of said control and efflux means to reflex said jet discharge and said circulatory flow and in all adjustments thereof to direct the jet reaction upon said airfoil with resultant substantially constant pitching moments thereon from said flows.

References Cited in the file of this patent
UNITED STATES PATENTS

| | | |
|---|---|---|
| 2,478,793 | Trey | Aug. 9, 1949 |
| 2,585,676 | Poisson-Quinton | Feb. 12, 1952 |